US008056554B2

(12) United States Patent
    Hinderling

(10) Patent No.: US 8,056,554 B2
(45) Date of Patent: *Nov. 15, 2011

(54) MAN MADE ISLAND WITH SOLAR ENERGY COLLECTION FACILITIES

(75) Inventor: Thomas Hinderling, Bern (CH)

(73) Assignee: Nolaris SA, Neuchatel (CH)

( * ) Notice: Subject to any disclaimer, the term of this patent is extended or adjusted under 35 U.S.C. 154(b) by 22 days.

This patent is subject to a terminal disclaimer.

(21) Appl. No.: 12/612,512

(22) Filed: Nov. 4, 2009

(65) Prior Publication Data

US 2010/0059046 A1    Mar. 11, 2010

Related U.S. Application Data

(63) Continuation of application No. 12/188,351, filed on Aug. 8, 2008, which is a continuation of application No. PCT/US2008/055925, filed on Mar. 5, 2008.

(60) Provisional application No. 60/892,956, filed on Mar. 5, 2007.

(51) Int. Cl.
    *E04D 13/18*        (2006.01)
(52) U.S. Cl. ........ 126/628; 126/565; 126/568; 126/573; 126/600; 126/646; 60/721; 136/206
(58) Field of Classification Search .................. 126/628, 126/573, 565, 568, 600, 690, 696, 563, 564, 126/698, 700; 136/206, 246, 298; 60/721; 202/182
    See application file for complete search history.

(56) References Cited

U.S. PATENT DOCUMENTS

| 2,412,466 | A |   | 12/1946 | Miller, Jr. |
| 3,077,190 | A | * | 2/1963  | Allen ............................ 126/568 |
| 3,314,862 | A |   | 4/1967  | Hay |
| 3,408,260 | A | * | 10/1968 | Feldman et al. ................ 202/83 |
| 3,841,976 | A | * | 10/1974 | Scott et al. ..................... 202/236 |
| 3,861,379 | A |   | 1/1975  | Anderson |
| 3,893,304 | A |   | 7/1975  | Pochitalof-Huvale et al. |
| 3,924,604 | A |   | 12/1975 | Anderson |

(Continued)

FOREIGN PATENT DOCUMENTS

DE        36 33 172        4/1988

(Continued)

OTHER PUBLICATIONS

Machine Translation: Patent FR-2471564; esp@cenet (r); Translation provided Apr. 19, 2010.

(Continued)

*Primary Examiner* — Steven B McAllister
*Assistant Examiner* — Avinash Savani
(74) *Attorney, Agent, or Firm* — Wood Herron & Evans LLP

(57)    ABSTRACT

A man-made island adaptable for land-based operation holds solar energy collection facilities and is rotatable to optimize the angular orientation thereof relative to the position of the sun. A platform includes a large outer ring that floats on a fluid and a flexible cover is attached to the ring to define an airtight volume below the cover. A plurality of rows of solar radiation collector modules are located above the cover and carry steam generating heat pipes. The rows of modules are supported laterally above the cover by an upper support structure, either a space frame, a plurality of cables, or a honeycomb. A compressor creates an over-pressure within the enclosed volume to vertically support the cover and the other components mounted thereabove.

19 Claims, 14 Drawing Sheets

U.S. PATENT DOCUMENTS

| | | | |
|---|---|---|---|
| 4,136,674 A | | 1/1979 | Korr |
| 4,146,015 A | | 3/1979 | Acker |
| 4,148,301 A | | 4/1979 | Cluff |
| 4,159,427 A | | 6/1979 | Wiedemann |
| 4,159,629 A | | 7/1979 | Korr et al. |
| 4,172,766 A | | 10/1979 | Laing et al. |
| 4,182,307 A | * | 1/1980 | Brindle et al. ............... 126/625 |
| 4,203,426 A | | 5/1980 | Matlock et al. |
| 4,210,121 A | | 7/1980 | Stark |
| 4,214,572 A | | 7/1980 | Gonder |
| 4,219,387 A | * | 8/1980 | Gruntman ................... 202/182 |
| 4,227,511 A | | 10/1980 | Margen et al. |
| 4,235,221 A | * | 11/1980 | Murphy ........................ 126/567 |
| 4,289,112 A | | 9/1981 | Roseen |
| 4,296,731 A | | 10/1981 | Cluff |
| 4,315,500 A | | 2/1982 | Gonder |
| 4,318,394 A | | 3/1982 | Alexander |
| 4,319,141 A | | 3/1982 | Schmugge |
| 4,349,013 A | | 9/1982 | Uroshevich |
| 4,350,143 A | | 9/1982 | Laing et al. |
| 4,355,511 A | | 10/1982 | Jones |
| 4,360,004 A | | 11/1982 | Testolini |
| 4,380,993 A | | 4/1983 | Spitzer |
| 4,455,833 A | | 6/1984 | Tiboldi |
| 4,483,323 A | | 11/1984 | Murphy |
| 4,552,438 A | | 11/1985 | Murphy |
| 4,601,072 A | | 7/1986 | Aine |
| 4,649,900 A | | 3/1987 | Trihey |
| 4,719,902 A | | 1/1988 | Klier et al. |
| 4,771,764 A | | 9/1988 | Cluff |
| 4,815,442 A | | 3/1989 | Klier et al. |
| 4,928,665 A | | 5/1990 | Klier et al. |
| 5,167,217 A | | 12/1992 | Klier et al. |
| 5,286,305 A | | 2/1994 | Laing |
| 5,347,984 A | | 9/1994 | Klaren |
| 5,404,868 A | | 4/1995 | Sankrithi |
| 5,445,177 A | | 8/1995 | Laing et al. |
| 5,483,913 A | | 1/1996 | Ohkawa et al. |
| 5,665,174 A | | 9/1997 | Laing et al. |
| 5,675,938 A | | 10/1997 | McLorg |
| 5,772,791 A | | 6/1998 | Laing |
| 6,080,927 A | | 6/2000 | Johnson |
| 6,220,241 B1 | | 4/2001 | Yeomans |
| 6,294,844 B1 | | 9/2001 | Lagerwey |
| 6,498,290 B1 | | 12/2002 | Lawheed |
| 6,877,507 B2 | | 4/2005 | Braun |
| 7,299,632 B2 | | 11/2007 | Laing et al. |
| 2004/0060808 A1 | | 4/2004 | LaViolette |
| 2004/0187907 A1 | * | 9/2004 | Morgal ........................ 136/246 |
| 2004/0206030 A1 | | 10/2004 | Juedes et al. |
| 2005/0028524 A1 | | 2/2005 | Laing et al. |
| 2006/0260605 A1 | | 11/2006 | Connor |
| 2007/0107718 A1 | | 5/2007 | Filippone |
| 2007/0234945 A1 | | 10/2007 | Khouri et al. |
| 2008/0029148 A1 | | 2/2008 | Thompson |
| 2008/0210220 A1 | | 9/2008 | Perslow |
| 2008/0257398 A1 | | 10/2008 | Laing et al. |
| 2008/0302357 A1 | | 12/2008 | DeNault |
| 2009/0107484 A1 | | 4/2009 | Bender |
| 2009/0133732 A1 | | 5/2009 | Hsia et al. |
| 2009/0139512 A1 | | 6/2009 | Lima |
| 2009/0314926 A1 | | 12/2009 | Hinderling et al. |
| 2010/0071683 A1 | | 3/2010 | Selig et al. |

FOREIGN PATENT DOCUMENTS

| | | | |
|---|---|---|---|
| DE | 39 34517 | | 4/1991 |
| DE | 40 06 516 A1 | | 9/1991 |
| DE | 4126623 A1 | | 2/1993 |
| DE | 4130753 A1 | | 3/1993 |
| DE | 101 56 184 A1 | | 6/2003 |
| DE | 103 18 036 | | 11/2004 |
| FR | 2-471564 | * | 12/1980 |
| FR | 2 471 564 A | | 6/1981 |
| FR | 2471564 A | | 6/1981 |
| FR | 2600697 A1 | | 12/1987 |
| WO | 9117573 A2 | | 11/1991 |
| WO | 9309390 A1 | | 5/1993 |
| WO | 99/46543 | | 9/1999 |
| WO | 2009/001225 | | 12/2008 |

OTHER PUBLICATIONS

Official Action mailed May 10, 2010, in related U.S. Appl. No. 12/554,455 (12 pages).

U.S. Patent and Trademark Office, Non-Final Office Action, in related U.S. Appl. No. 12/554,455, dated May 10, 2010, 14 pp.

Babara Van Rooijen; Invitation to Pay Additional Fees, Partial International Search; mailed: Mar. 3, 2009; 5 pages; European Patent Office.

Esp@cenet translation of patent No. FR2471564A to Studsvik Energiteknik AB, Jun. 19, 1981.

Esp@cenet translation of patent No. DE4006516A1 to Laing, Apr. 26, 1991.

Esp@cenet translation of patent No. DE10156184A1 to Lambrecht, Jun. 5, 2003.

Frank Mootz; International Search Report and Written Opinion issued in related Application No. PCT/IB2009/000055; Jul. 7, 2009; 14 pages; European Patent Office.

* cited by examiner

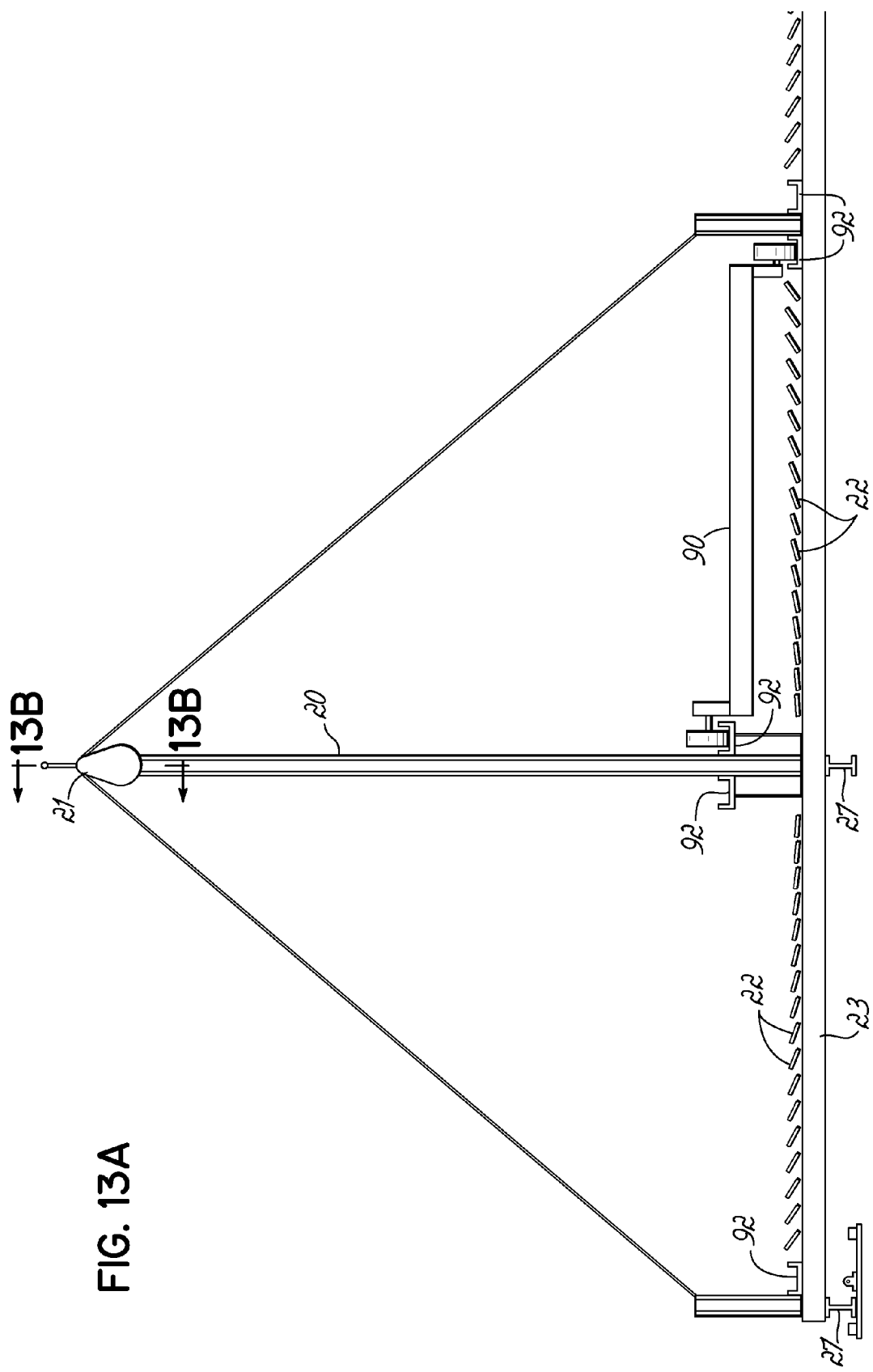

MAN MADE ISLAND WITH SOLAR ENERGY COLLECTION FACILITIES

CROSS-REFERENCE TO RELATED APPLICATION

This application is a continuation of U.S. patent application Ser. No. 12/188,351, filed on Aug. 8, 2008, which is a continuation of International Application No. PCT/US2008/55925, filed on Mar. 5, 2008, and which claims priority to U.S. Provisional Patent Application Ser. No. 60/892,956 filed on Mar. 5, 2007. Each of these above-referenced applications is incorporated by reference herein in its entirety.

TECHNICAL FIELD

The present invention relates to a land-based man-made island that is equipped with solar energy collection facilities. More particularly, the present invention relates to a large scale structure of this type which is capable of producing electrical energy in a cost-effective manner via solar thermal technology.

BACKGROUND

It is generally accepted that the earth is fast approaching an energy crisis of incalculable proportions. Some say that crisis will occur around the year 2040.

It appears that solar power may be the only source that can theoretically overcome the upcoming energy crisis without disrupting energy costs. Geothermal or tidal energy is a distant second possibility, but clearly at much higher costs.

Solar energy is principally suited to mitigating such a future energy crisis. For instance, almost 10,000 GTEP (TEP=Tons Equivalent Petrol) of solar radiation reaches the earth every year. Yet, only up to 5 GTEP of usable solar power would be needed to make a significant step toward energy sustainability for the earth.

However, there have been practical limitations to large-scale implementation of energy producing systems that rely on the sun. For example, photovoltaic cells are capable of converting solar energy (i.e. sunlight) to usable energy, i.e. electricity. But the overall efficiency of these devices is about 10-18%, depending on the materials used. Also, higher efficiency generally requires more expensive materials. Still further, the manufacture of photovoltaic cells requires the use of highly toxic chemicals, which present a significant and ever-expanding environmental problem. Photovoltaic technology will be very important but is not yet usable in large scale.

For these reasons, solar thermal technology, the other main technology for converting solar energy to electricity, seems to be the best solution for producing a sufficient number of GTEPs in the foreseeable future, while remaining relatively inexpensive.

A specific solar thermal technology that is now widely being used in pilot applications is the solar parabolic trough. A parabolic trough, shaped like the bottom half of a large drainpipe, reflects sunlight to a central receiver tube that runs above it. Pressurized water or other fluids are heated in the tube and used to generate steam, which can then drive turbo-generators to produce electricity or to provide heat energy for industry.

In theory, parabolic troughs have had the potential for efficient electricity production, because they can achieve relatively high turbine inlet temperatures. However, in practice the land requirements for this technology are significant. Moreover, recent studies indicate that previously estimated electricity costs, using this technology, may have been over-optimistic. In short, the perceived promise on this technology has not yet delivered tangible benefits, in a practical sense, both due to inefficiencies or excessive costs, and also due to the inherent limitations. More specifically, these trough collectors require expensive and maintenance-intensive guidance systems to dynamically adjust the angular positions of the panels of the trough, dependent on the sun's position. This requires expensive gear drives, and also large support structures that can withstand significant load fluctuations and other structural considerations. They are difficult to clean and susceptible to wind.

It is an object of the present invention to achieve practical and tangible progress in harnessing solar energy, to mitigate the known concerns associated with current sources of electrical energy, including the possibility of a significant energy crisis in the foreseeable future.

It is another object of this invention to facilitate the large scale generation of electrical energy via the use of solar radiation, and to do so at an economically viable cost.

SUMMARY

The present invention achieves these objectives by placing solar radiation collector modules on a large scale lightweight man-made island or islands that are low-cost, up to several hundred meters in diameter, and possibly even constructed with a diameter of over one kilometer. The island could either operate at sea, on large natural lakes, or on land where it would be based within a recessed trough of concrete that would hold a fluid of appropriate viscosity such as natural oil, or even water. The island floats. The word lightweight refers to specific weight, that is, platform surface space/overall weight.

This island will be relatively tall in height, e.g., more than 10 meters, and possibly even as tall as 30 meters to avoid or at least minimize any negative effects of rough seas, etc. The land version, however, can theoretically be built much lower, i.e. about 2 meters. Nonetheless, the land-based version could also benefit from a certain height if it is deployed in a difficult environment, such as a desert. In that case, a minimum height would help in enabling the solar concentrator modules to be located well above the desert surface, out of harm's way in the case of sand storms. The greatest abrasive effect of sand storms occurs in the boundary layer just above the ground. Generally, if the island is taller than the typical height of this boundary layer, the solar concentrators and other installations will be much less prone to suffer defects as a consequence of sand storms. The island rotates to track the position of the sun. The land-based version of this island floats on liquid held within a large ring-shaped trough, via a large outer ring structure sized to fit within the trough. The sea-based version also uses the outer ring structure. The floating outer ring facilitates rotation of the island to a desired orientation, to optimize the position of the solar radiation collectors located on the island. Instead of adjusting the positions of the multiple modules of the solar collectors, the collector modules are fixed in place, and adjustment of the collector modules is achieved through rotation of the entire island.

The island is essentially circular, although the outer ring structure does not have to be exactly circular. For the land version of the island, the base of the outer ring structure must have a bottom element that is close to circular in shape, to allow the bottom element to rotate around within the concrete trough described above. The outer ring could also be assembled from segments of straight pipe sections that have a cross-section that is round, square, oval or any other suitable shape. The outer ring structure may use typical features that are common in ship design, such as isolating the interior volumes within those pipe sections, to protect against the possibility of sinking, if the outer ring develops a leak. One preferred embodiment of the invention contemplates the use of pipe sections that are typically used for oil pipelines.

The outer ring structure could hold or support electrical facilities such as all the equipment for actually producing electrical energy in a Rankine cycle, by using the steam delivered from the solar concentrator modules. This would generally be state-of-the-art machinery such as steam turbines or Stirling engines or any other type of machine suitable to use steam to drive an electrical generator.

According to one preferred embodiment of this invention, a man-made island with solar collection facilities includes a floating platform, the platform primarily comprising a flexible cover, or foil, which extends across an outer ring structure and is sealed thereto. The top cover is an industrial-grade, long-life and UV-resistant material that is either vulcanized and/or clamped or attached by any other suitable manner to the outer ring structure, so that it is airtight. This creates an enclosed volume below the cover. A compressor system is installed so as to be in fluid communication with the enclosed volume and operable to create a slight over-pressure under the cover. Current studies show that an over-pressurization of about 0.005 bar should be sufficient, but in some situations it could be substantially greater. Also, the over-pressure is dynamically adjustable, as described below, to achieve and maintain a desired floating effect and to position the height of the cover, or membrane. It may be desirable to pressurize the enclosed volume to the point of creating an upwardly directed bulging effect, to facilitate rainwater runoff in a radial outward direction. Also, the cover could include channels to facilitate runoff in the desired direction. In fact, the runoff could be used as part of a sea-water desalinization system. To achieve the desired over-pressurization, a plurality of compressors, i.e. pumps, may be used.

For the land-based system, a land wire facility operatively connects the man-made island to the local grid. Where no substantial electrical grid is available for connection, a hydrogen production facility is connected. For the water-deployed version, the man-made island has a sufficient number of propulsion devices driven by electrical or other power distributed along the outer ring structure. These propulsion devices may move the island to a desired location, and also turn the island to a desired orientation relative to the sun.

The land-based version of the man-made island of this invention has centering mechanisms, namely wheels, for centering the island on its axis of rotation within the trough. To turn the island, this structure uses driveable wheels that roll on the outside of the concrete ring. Because the man-made island is floatably supported, the power actually needed to rotate the island is minimal. Relatively small motors distributed around the outer structure will be suitable for turning the island by approximately 180 degrees in one day due to the symmetrical layout of the collectors, although it would also be possible to turn the island 360 degrees in one day.

To reduce the total weight of the island, and to reduce susceptibility to flexing due to wind, the solar radiation collector modules supported on the platform have a flow-through lightweight design which allows air to actually flow through the concentrator panels. Such collectors can be assembled from plain industrially manufactured, mirrored band steel or aluminum. This type of design substantially reduces costs and weight compared to typical parabolic trough designs. Also, this design can be easily assembled in countries close to the equator, where difficult manufacturing processes, e.g., the bending of large-scale aluminum mirror elements, may not be feasible.

The enclosed volume of this man-made island is bounded by the outer ring structure, the cover, and the water surface (for the sea-based version), or the land surface (for the land-based version). For the land version, the sealing effect for the enclosed volume is achieved in part by the concrete trough. One particular advantage with the land version is that the earth surface underneath the cover can remain untreated. Also, this surface could hold some of the technical installations used to operate the island. Thus, those installations would not necessarily have to be supported by the outer ring structure, as would be the case for the man-made island floating at sea. If an installation were actually located under the platform, for the land version, overlying sections of the cover could be made of transparent material. This would provide for some ambient sunlight to reach facilities below, in which the operating team is working.

An upper structure resides above the cover, and supports the solar radiation collector modules. According to a first preferred embodiment, this upper structure is a space frame. According to a second preferred embodiment, a pre-tensioned cable system spans the cover, and the outer ring structure holds the mounts for these cables. Still further, a honeycomb structure could be used as this upper structure. The air cushion under the cover is maintained at a pressure that actually supports the upper structure. For this purpose the upper structure, or even the modules or the cover, holds a plurality of sensors, such as strain gauges, that are interconnected in a network that is operatively connected to a computer, which is in turn connected to the compressor system. The sensors measure a desired measurable condition related to the cover, such as the strain on the upper structure, at different places around the cover. The computer uses an appropriate algorithm and corresponding software to control the compressor system to dynamically adjust the air pressure under the cover, to minimize the strain on the upper structure, or to address the sensed condition in an appropriate manner. It is to be understood that any one of a number of other force measuring devices could be used to dynamically sense and analyze the mechanical load on the cover, the upper structure, or the modules, and to initiate an appropriate change in over-pressurization.

This man-made island is particularly lightweight because the upper structure holding the solar concentrator modules will barely have to be able to support its own weight. Any excess forces induced by wind or any other atmospheric or untoward effects can be compensated by the over-pressure cushion under the flexible cover, particularly via appropriate sensors and dynamic control of the compressor system.

According to another aspect of the invention, the outer ring structure has additional support frames on the outside thereof, to hold photovoltaic (PV) elements. Electrical power generated by those PV elements and their battery storage and DC/AC converter facilities could be used to power the positioning systems of the island and also the operating room systems, such as the drive system, and the compressor system.

According to still another aspect of the invention, the sea-based version contains propulsion equipment mounted at multiple points around the outer ring structure, to move the island north and south across the equator in parallel with the seasons. This enables the island to maintain a vertical position under the sun's daily path. It has been shown that solar power output could be increased by up to 15 percent per year if a solar energy production facility is actually able to follow the sun's path in the manner suggested here. The positioning system of such an island could include a GPS system with appropriate computing equipment including the algorithms and associated software establishing latitude and longitude based on the law of Cook (see http://fred.elie.free.fr/cadrans-_solaires.htm. The same positioning system would also maintain the island's angular position during the day when it essentially turns through about 180 degrees to follow the sun from rise in the east to sunset in the west.

A brief calculation of the potential output of this man-made island, with a diameter of 500 meters, is shown below. Such an island would have a surface area inside the outer ring structure of about 195,000 square meters. Solar radiation in the tropics is approximately 1 kW per square meter. Assuming a somewhat conservative overall transformation efficiency (concentrators, Rankine cycle etc.) of between 10 and 20 percent, the peak output of such an island can be estimated to be over 30 MW. This assumes that the island operates at peak power during about 8 hours per day. For purposes of this calculation, additional power generated at less than peak output during the morning and evening hours has been omitted. This would result in an output of approximately 240 MWh per day or about 85000 MWh per year, assuming that 15 days per year are reserved for maintenance operations. Thus, one such island could produce an amount of electrical power in one year that is approximately worth $12.75 million at an average sales price of $0.15/kWh. According to a more conservative assessment, the mean power over a period of 24 hours would be 7.4 MW. Using the same general assumptions as stated above, this would result in an output of approximately 177 MWh per day, or about 61,850 MWh per year, worth approximately $9.28 million at the same average sales price listed above.

The economics behind this man-made island become more attractive as the size of the island increases, Also, the increase in size further increases stability for the water-deployed version, particularly in adverse weather. Thus, this inventive man-made solar island represents a major contribution toward sustainable energy production that will so desperately be needed in the near future.

The over-pressurization of the enclosed volume below the cover plays a significant role in supporting the solar radiation collector modules. More particularly, to generate electricity from solar radiation at an economically viable cost, the surface area needed is extremely large. Although commercially available solar collectors continue to improve in efficiency, the surface area requirements, i.e. the surface area occupied by the collectors, are still immense. The need for large surface area creates other practical considerations, namely how to sufficiently support the collectors on a load bearing structure that is also reorientatable relative to the position of the sun. With this invention, the answer is threefold. First, the large outer ring floatably supports the periphery of the island. Second, the over-pressurized volume below the cover helps to balance the load on the platform. Third, the use of an appropriate upper support structure, i.e. a lightweight space frame, or alternatively, a tensioned cable system, or a honeycomb structure, further assures adequate lateral mechanical support for the solar collector modules mounted on top.

A water supply pipe (inbound) and a steam pipe (outbound) connect to the solar radiation collector modules via a rotary joint located at the center of the island. This joint must be able to accommodate the rotation of the island. This can be done by a coaxial configuration, a coaxial swiveling joint or even by a suitable length of a flexible hose.

Once these pipes have reached the top of the platform, they are routed along the rows of the solar radiation collector modules, to generate usable steam via heat pipes onto which the sunlight is concentrated. Because the length of the various pipes extending from the center of the island to all of the various collector modules will differ, pressure regulator valves are used to moderate and control any undesired pressure differences.

Along the modules, various layouts or arrangements of the heat pipe layout are possible. One such arrangement involves running the outbound water lines along the tops of the heat pipes of the solar collector modules, to preheat the water flowing in these upper pipes as a result of their proximity to the respective heat pipes located therebelow.

The present invention also contemplates the capability of cleaning and servicing the solar collector modules via a driveable cart, or other device, that moves along a rail or track that extends alongside the rows of collectors. This device could be a robot that directs pressurized fluid, most likely air, at the surfaces of the modules. The track could be a dual rail track which supports a wheeled cart, or even a monorail-type track. The wheeled cart configuration enables travel along the rails to any desired position on the platform to provide access for any needed maintenance.

These and other features of the invention will be more readily understood in view of the following detailed description and the drawings.

BRIEF DESCRIPTION OF THE DRAWINGS

FIG. 13A is a longitudinal view along one of the rows of Fresnel collectors, showing a rail supported cart which facilitates service and maintenance.

DETAILED DESCRIPTION

The present application claims the priority benefit of U.S. Provisional Application Ser. No. 60/892,956 filed Mar. 5, 2007, entitled "Solar Island"; and PCT Application No. US2008/55925, filed Mar. 5, 2008, with the same title. These applications are expressly incorporated by reference herein, in their entireties.

Figure 1:
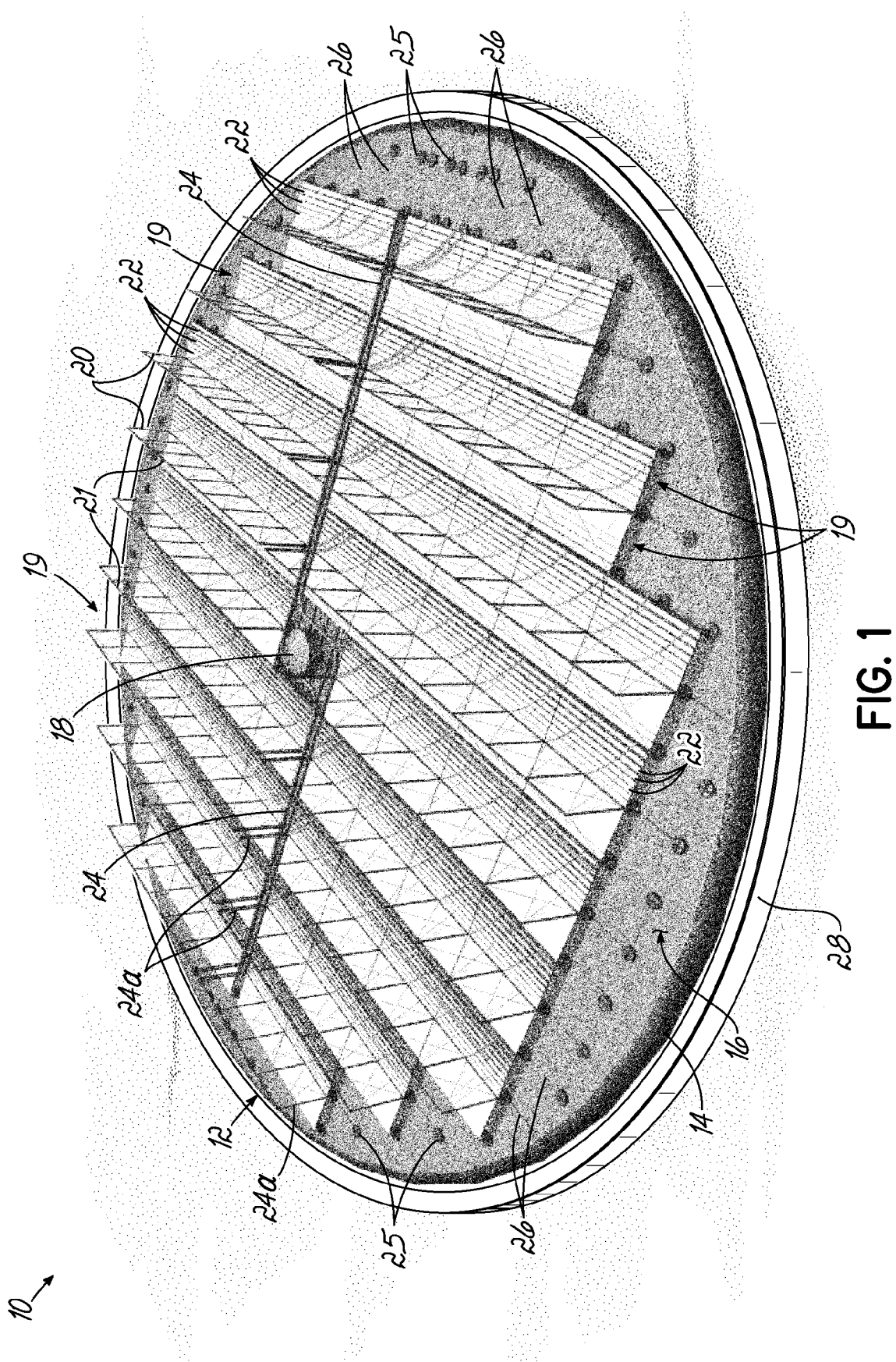
FIG. 1 is a perspective view of the man-made island constructed according to a first preferred embodiment of the invention.

FIG. 1 shows a man-made island 10 constructed in accordance with one preferred embodiment of the invention. The island 10 generally comprises a horizontal platform 12, which in turn includes an outer support ring structure 14 that is spanned by a flexible cover 16. The cover 16 may be of any suitable flexible material that can be sealed along its opposing longitudinal edges, such as for instance by gluing, heat welding, or vulcanizing the adjacently located edges. In an initial prototype of the invention, for the cover 16 applicants are using an industrial foil known as SIKA Sarnafil TS 77-20. The island 10 includes a central hub 18 which will be described later in more detail.

The platform 12 supports a plurality of solar radiation collector modules arranged end to end in a plurality of parallel rows 19. Any given row 19 of modules includes a plurality of wire supported uprights 20, which in turn hold a horizontally oriented heat pipe 21. Each of the rows 19 includes a plurality of lower, parallel mounted solar concentrators, or reflector panels 22. Each of the concentrators 22 is fixed at a desired angle, so that all of the reflectors 22 reflect, or direct, sunlight upwardly toward the heat pipe 21. The platform 12 rotates to keep the rows 19 oriented towards the sun.

A water supply pipe and a steam pipe are routed to the central hub 18, and connect to two conduits 24 that extend in opposite directions. The conduits 24 connect to sub branches 24a that extend generally along the center of the island 10, so that in each row 19, the supply water can flow out and back along the respective heat pipe 21.

FIG. 1 also shows a plurality of pods 25 distributed across the upper surface of the cover 16, in a grid pattern designated generally by reference number 26. Although not shown in particular detail in FIG. 1, the pods 25 support a lightweight space frame 27, which generally occupies the spaces designated by the gridlines 26 in FIG. 1. The space frame 27 in turn supports the rows 19 of solar radiation collector modules. The space frame 27 is one form of the upper structure used to support the rows 19 of modules.

Figure 1A:
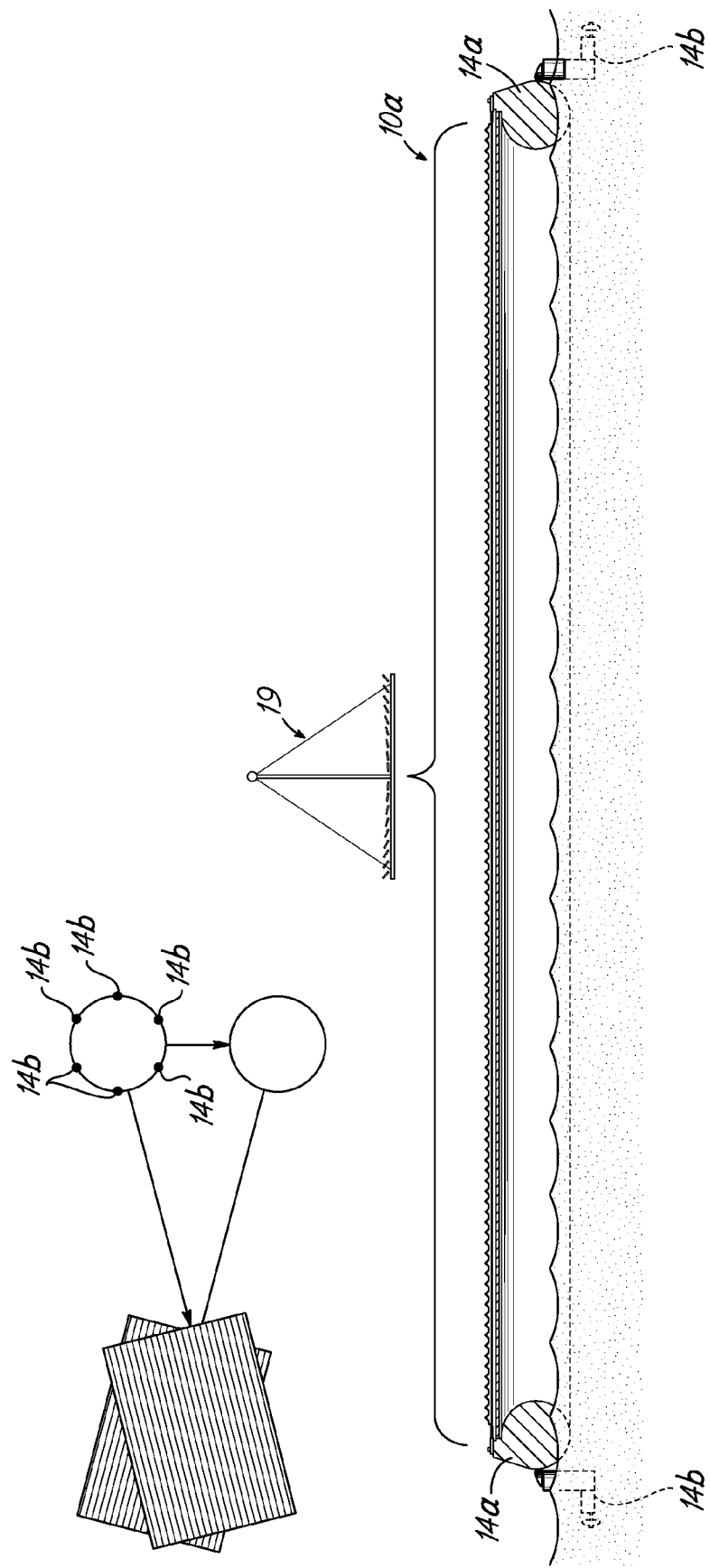
FIG. 1A is a horizontal sectional view which schematically shows a sea-bound version of the man-made island, according to one aspect of the invention.

FIG. 1A shows a sea borne version 10a of the island, bounded by a sea-borne outer ring 14a. Propulsion equipment 14b, i.e., suitably mounted outboard motors, are located at a selected number of points on the periphery of the sea borne ring 14a.

Figure 2:
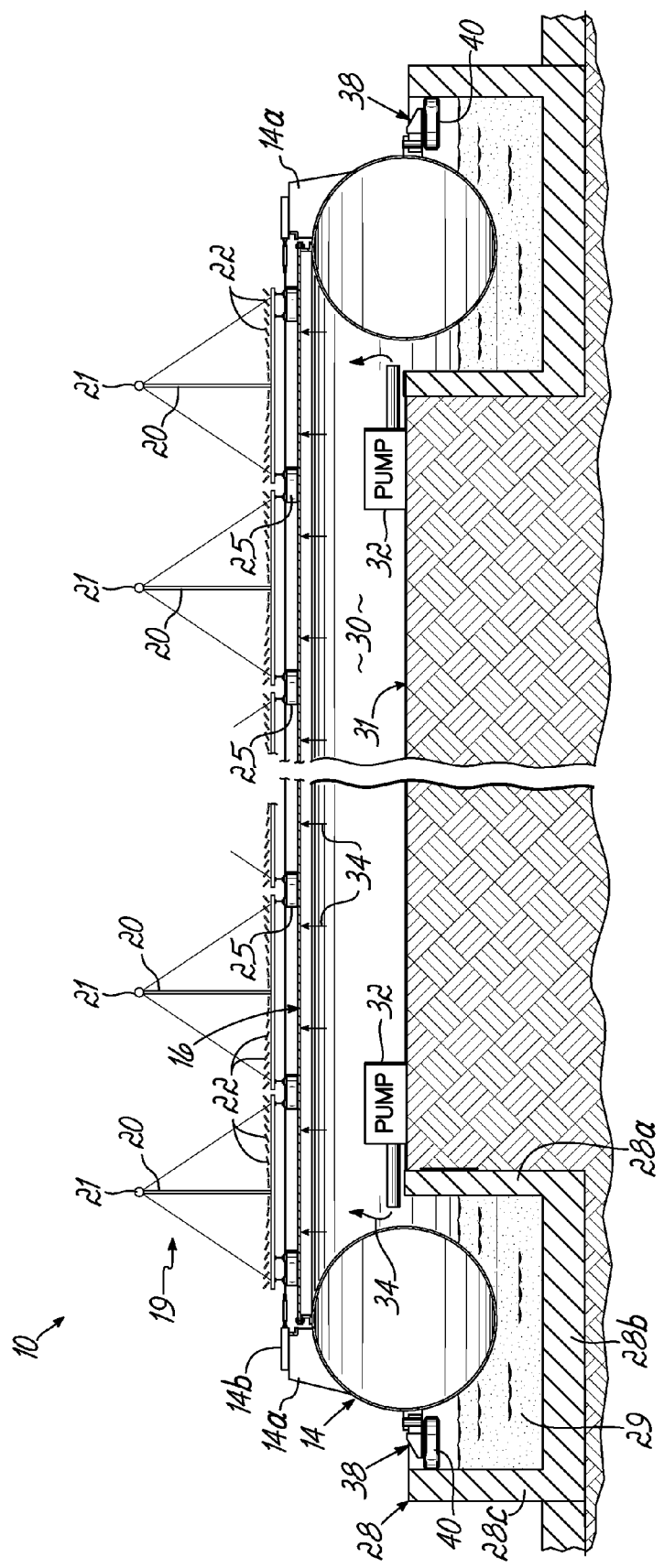
FIG. 2 is a horizontal sectional view which schematically shows a land-based version of the man-made island, according to another aspect of the invention.

As described above, land-based or sea-based, this inventor contemplates a man-made island as a floating structure. FIG. 2 shows more details of the structural components of one preferred embodiment of the land-borne version of this man-made island 10. More particularly, FIG. 2 shows the overall structure, and the manner in which the island 10 is floatably supported by the outer ring 14. Preferably, the ring 14 is made of connectable, prefabricated segments of steel, concrete, plastic, aluminum, or any other suitable material. If the segments of the ring 14 are made of steel, they are preferably welded together. Particularly for a sea-based version of the island 10, the segments have internal support structures. These internal support structures isolate adjacently located segments of the ring 14, so as to isolate any leaks that might occur. In one prototype construction of the land-based version of this island 10, the platform 12 is about 85 meters in diameter, the segments have a diameter of about two meters, and a length of about 7.5 meters. Preferably, the sections of the ring 14 are placed and interconnected while in the trench 28, and preferably supported on a temporary structure which can then be removed after the trench 28 is filled with water 29. The trench 28 must be able to support the weight of the ring 14. For the prototype, applicants estimate that the ring 14 will have a total weight of about 100 tons (100,000 kg), which corresponds to a weight of about 380 kg per square meter.

FIG. 2 shows the outer ring 14 floatably located within a trench or trough 28. As shown in FIG. 2, the trench has an inside wall 28a, a bottom wall 28b, and an outer wall 28c. The trench 28 is preferably made of concrete. The thickness of each of the walls 28a, 28b, and 28c is determined according to local geological surveys and any applicable building code. The trench 28 includes a fluid of suitable viscosity, and particularly a liquid such as water 29, so as to float the support ring 14.

FIG. 2 also shows the enclosed volume 30 located below the cover 16, and further defined, or bounded by the ring 14, the water 29 in the trough 28, and the ground 31 or floor surface located in the center of the island 10. Preferably, the surface 31 is even with the top of the inside wall 28a. This may be done by sand-filling, and the sand then covered by PVC foil of 2 mm thickness, preferably a flexible polyolefin based foil reinforced with polyester thread and/or a fleece made of glassfibre. A compressor system 32, preferably a plurality of compressors, or pumps, is located so as to be in fluid communication with the enclosed volume 30. In FIG. 2, the pump 32 is shown below the floor 31 in the middle of the island 10. Nonetheless, it could also be centrally located within an operations room or facility for operating the island 10, or even placed on the ring 14. The pump 32 pumps air into the enclosed volume 30, as shown by directional arrows 34, to maintain a suitable over-pressurization condition beneath the cover 16 and within volume 30. Applicants currently expect that the actual amount of over-pressure within the enclosed volume 30 will be about 0.005 bar, although that value may vary somewhat depending upon the dynamic conditions, and in some situations it could be substantially greater. FIG. 2 also shows an upwardly extending outer rim structure 14a, which extends upwardly from each of the segments of the ring 14 to create an outer top surface 14b around the top of the ring 14.

Figure 3:
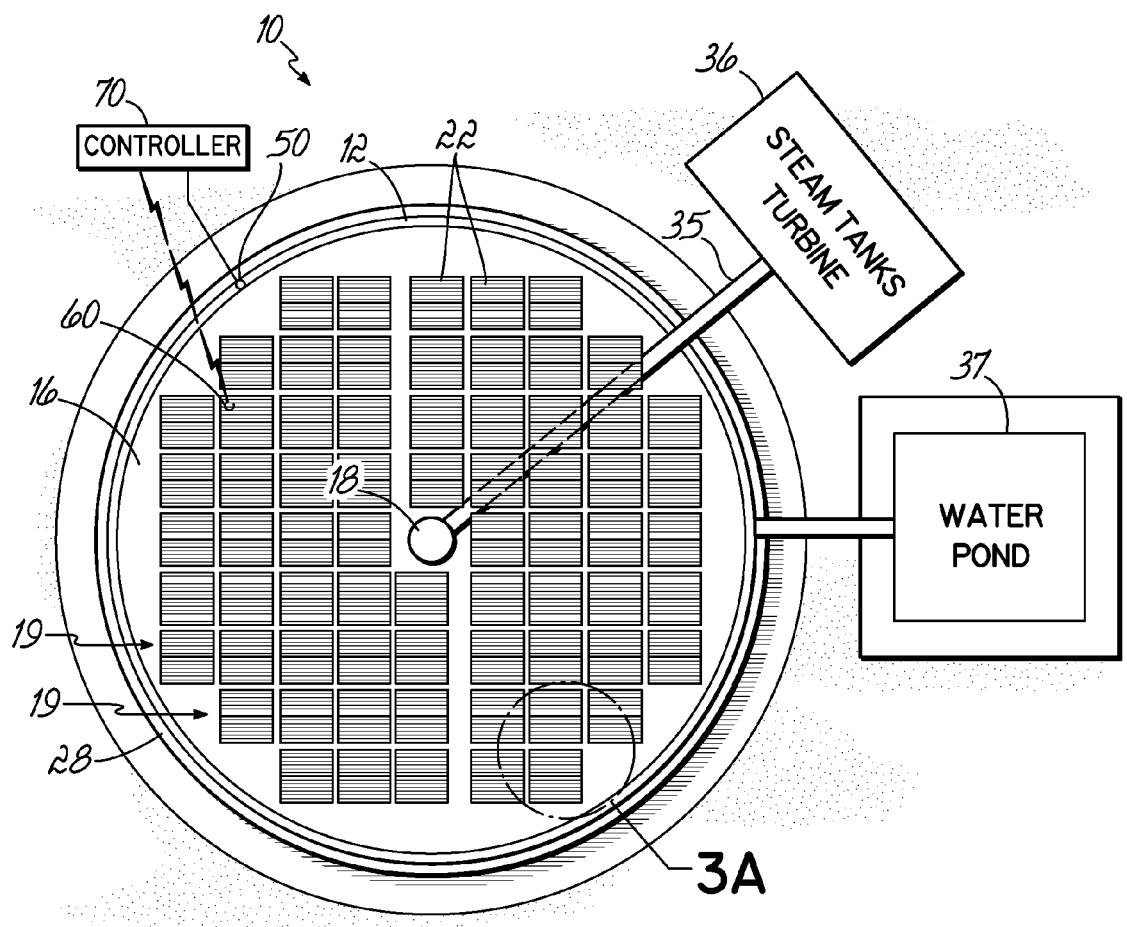
FIG. 3 is a plan view, in schematic form, which shows a land-based version of the man-made island of this invention.

FIG. 3 shows one example of the land-based version of this man-made island 10, including a radially oriented subsurface tunnel 35 that extends outwardly from the center hub 18 of the structure, beyond the outer wall 28c of the trench 28 to an energy facility 36, which may be a turbine generator or other facility for storing or using the solar generated steam produced by the island 10. Preferably, the tunnel 35 carries the water pipes which connect to the conduits 24, and also any electrical connectors. The tunnel 35 floor slopes downward from the center of the island 10, so as to extend below the bottom of the trench 28 and also to prevent any water or other liquid from flowing to the center of the island 10. A pond 37 is located nearby to supply water to the trench 28, as needed. It preferably connects to trench 28 from below, to facilitate quick draining of the trench 28.

FIG. 3 also shows another view of the rows 19 of modules. Generally, for each module the concentrators 22 are about 8 meters in length.

Figure 4A:
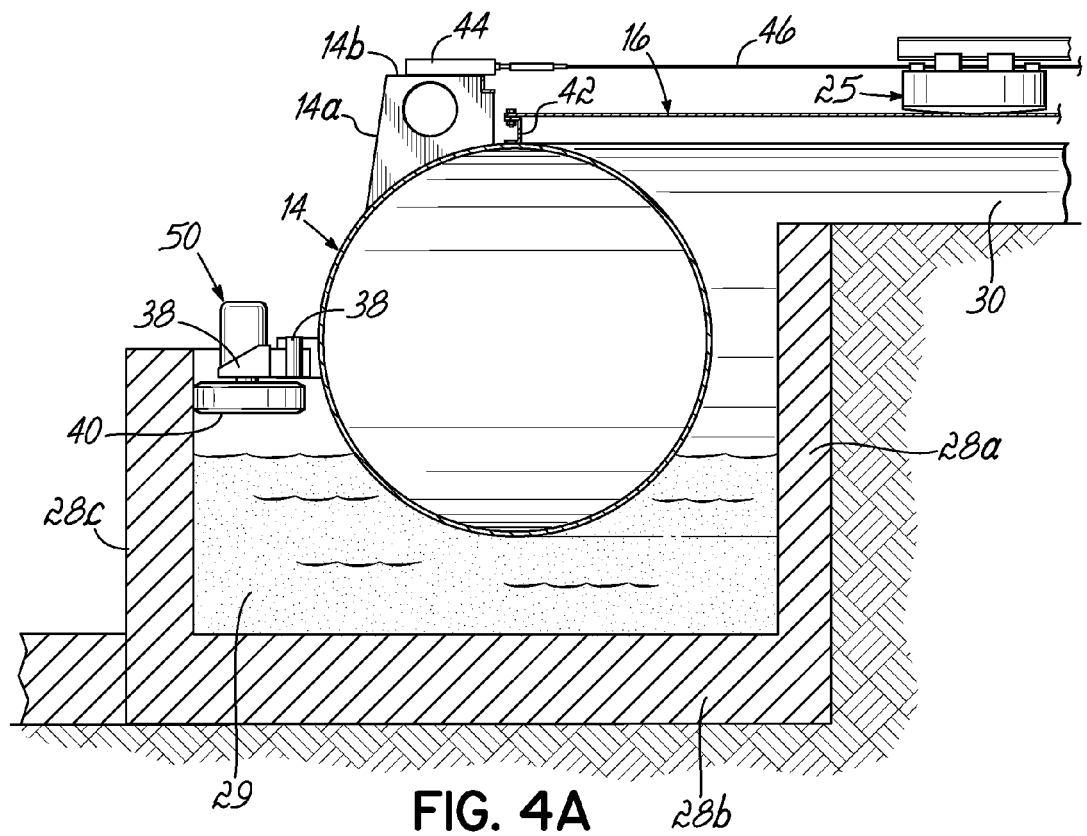
FIG. 4A is a horizontal sectional view which schematically shows the outer ring structure and the trough of a land-based man-made island according to one preferred embodiment of the invention.

FIG. 2 and also FIG. 4A show details of a centering mechanism 38 that centers the island 10 on its central axis. More specifically, the centering mechanism 38 resides radially beyond the ring 14 and within the inside surface of the outer wall 28c of trench 28. This centering mechanism 38 comprises a bracket 39 mounted to the ring 14, which supports a rotatable wheel 40 that resides in contact with the outer wall 28c. It is important that the inner surface of the outer wall 28c be constructed so as to be perfectly round, or with a very low tolerance. This requirement is necessary because angular adjustment of the island 10 is achieved via these wheels 40. The invention also contemplates an alternative mounting option, namely, that of mounting the brackets 39 on the outer wall 28c so that the wheels 40 contact the ring 14.

Although the number of wheels 40 may vary, applicants expect that twelve such wheels 40 will be needed around the circumference of the ring 14, with the wheels spaced every 30 degrees. Nonetheless, additional wheels could be used to more equally distribute the load between the outer wall 28c and the ring 14. The wheels 40 can be standard automotive wheels. Also, some of the wheels 40, preferably four, serve the additional purpose of rotatably driving the ring 14 about its axis to a desired position, to optimize the performance of the reflectors 22. Thus, some of the wheels 40 are part of the centering mechanism and the driving mechanism. FIG. 4A also shows a motor housing 50, which indicates that the wheel 40 shown is one of the four dual purpose wheels 40.

Those skilled in the art will appreciate that at any given time the force between the wheels 40 and the wall 28c will act on only one side of the ring 14, depending upon the direction of the wind. Thus, only about half of the centering wheels 40 will be used to transmit angular force to the ring relative to the outer wall 28c. Nonetheless, the outer wall 28c and its foundation must be dimensioned and reinforced so as to carry this load. If there is no wind at all, or very low wind, then all of the wheels 40 will contact the outer wall 28c and carry the rotational load, although the load will be more evenly distributed about the entire circumference of the ring 14.

Figure 4B:
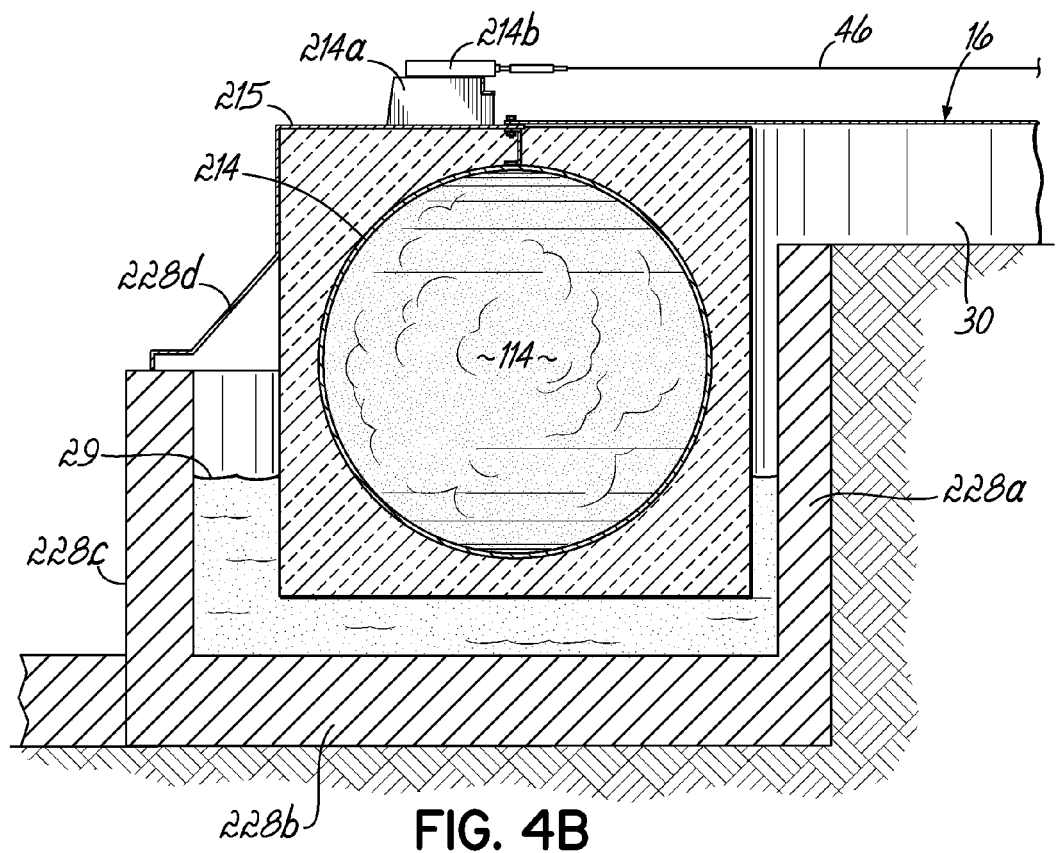
FIG. 4B is a horizontal section view, similar to FIG. 4A, which schematically shows yet another variation of the outer ring structure and the trough, for the land-based version of the man-made island of this invention.

FIGS. 4A and 4B show the outer ring structure 14, along with some of the structural details of the island 10. Due to the larger size of FIG. 4A (compared to FIG. 2), FIG. 4A shows more clearly an outer bracket 42, preferably a steel ring torus with a U-shape, turned on its side, which secures or clamps the outer peripheral edge of the cover 16, FIG. 4A also shows some aspects of one preferred structure used to support the rows 19 of solar collector modules. More particularly, FIG. 4A shows details of a tensioned cable system which coacts with the pod 25. It is expected that the cable 46 will need to accommodate a tension force in the range of about 10-25 KN. More particularly, a fixed mounting support 44 holds the outer end of a tightened cable 46 which spans across the island 10 above the cover 16, in a manner which enables the pods 25 to essentially hang from, or be suspended between, the cable 46 above and the cover 16 below. Preferably, the pods 25 are adapted to accommodate the cable 46 of such a cable system and also the space frame components, to enhance versatility in constructing the island 10 and in supporting the solar collector modules.

FIG. 4B is similar to FIG. 4A, except FIG. 4B shows another variation of the invention wherein the ring 214 stores steam 114 generated by the collector modules, and the ring 214 is encased within a square-shaped (in cross section) outer insulation section 215. FIG. 4B also shows an outwardly extending skirt 228d that extends from the ring 214 to the outer wall 228c of the trench 228. This skirt 228d is usable with the other variations of the invention. The skirt 228d helps to prevent evaporation of fluid from the trough 228, and may also aid in preventing dust or other debris from falling therein.

Figure 5:
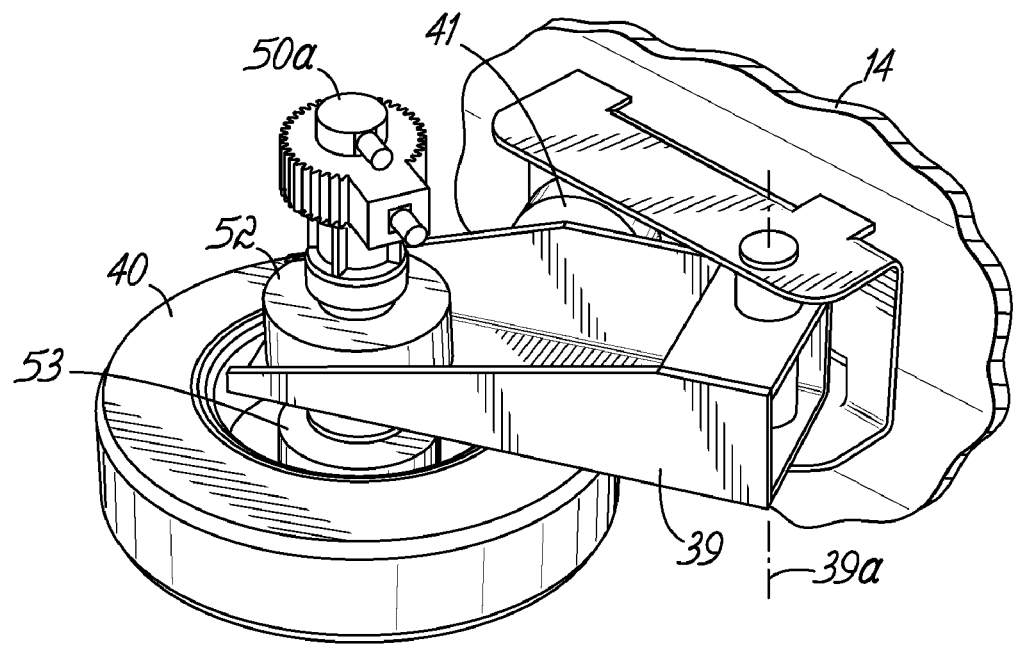
FIG. 5 is a perspective view of a drive wheel unit, shown connected to the outer ring structure, according to one preferred embodiment of the drive mechanism of this invention.
Figure 6:
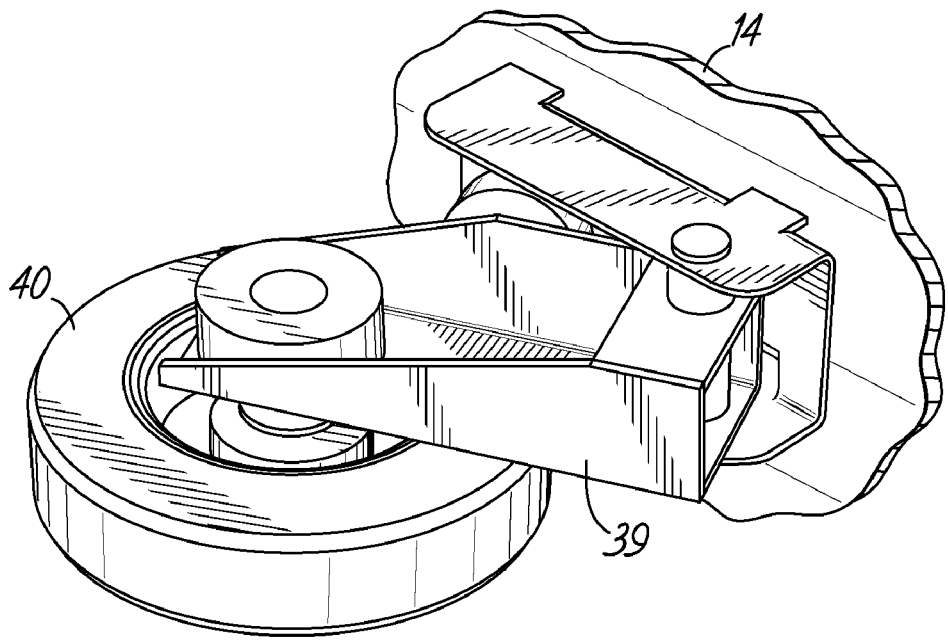
FIG. 6 is a perspective view, similar to FIG. 4, of a centering wheel unit, shown connected to the outer ring structure, according to one preferred embodiment of the centering mechanism of this invention.

FIG. 5 more clearly shows one of the centering wheels 40 that is also used to rotatably drive the island 10. This is achieved by mounting a drive mechanism, i.e. a motor 50a, to the same structure which supports a centering wheel, as shown in FIG. 6.

In either case, the wheel 40 has a bracket 39 mounted to the ring 14. The bracket 39 includes a horizontally oriented hinge axis 39a, and a spring 41 that acts as a shock absorber between the hingedly connected sections of the bracket 39 (hingedly connected with respect to the axis 39a). FIG. 4A shows a motor housing 50, which covers the motor 50a that is shown in FIG. 5. Preferably, the drive mechanism includes a speed reducer 52 and an adapter 53 mounted to the bracket 39 with the wheel 40. Still further, as shown in FIG. 3, the motor housing 50 operatively connects to a computer controller 70 via an electrical connection, to rotatably control the angular position of the island 10. This electrical connection could be wireless, if desired, or via any other suitably convenient electrical connector.

Figure 7A:
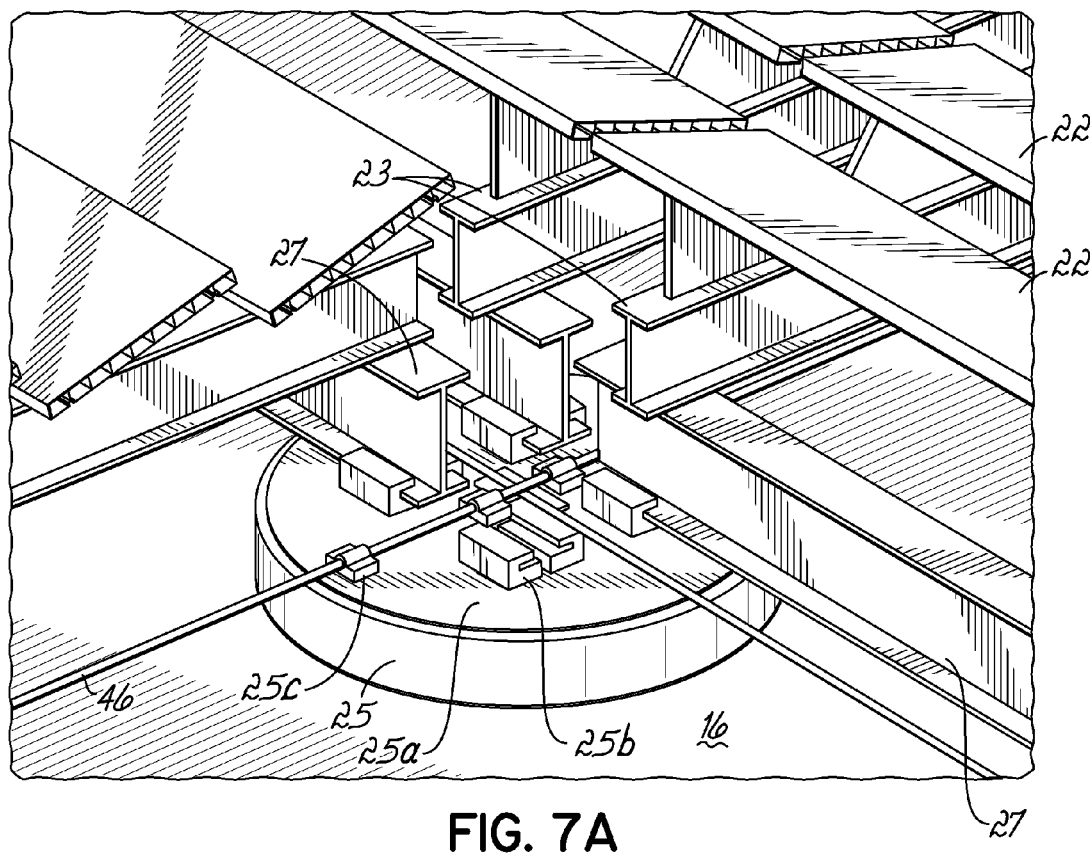
FIG. 7A is a perspective view of a pod supporting a portion of a lightweight space frame on the cover of the platform, in accordance with a first preferred embodiment of the upper structure of this invention.

FIG. 7A shows an enlarged view of one portion of this man-made island 10, and particularly a portion where a space frame 27 mounts to one of the pods 25. FIG. 7A particularly shows that the space frame 27 preferably uses an I-beam construction. FIG. 7A also shows that a top 25a of the pod 25 includes upwardly directed channel brackets 25b for securely holding the lower ends of the space frame 27. These brackets 25b may be part of a top piece 25a of the pod 25, in the form of a plate, to which the brackets 25b are connected by any sufficient securement mechanism. FIG. 7A also shows the concentrators 22 supported on a lattice or pallet-like structure 23, which also preferably uses an I-beam construction.

Figure 7B:
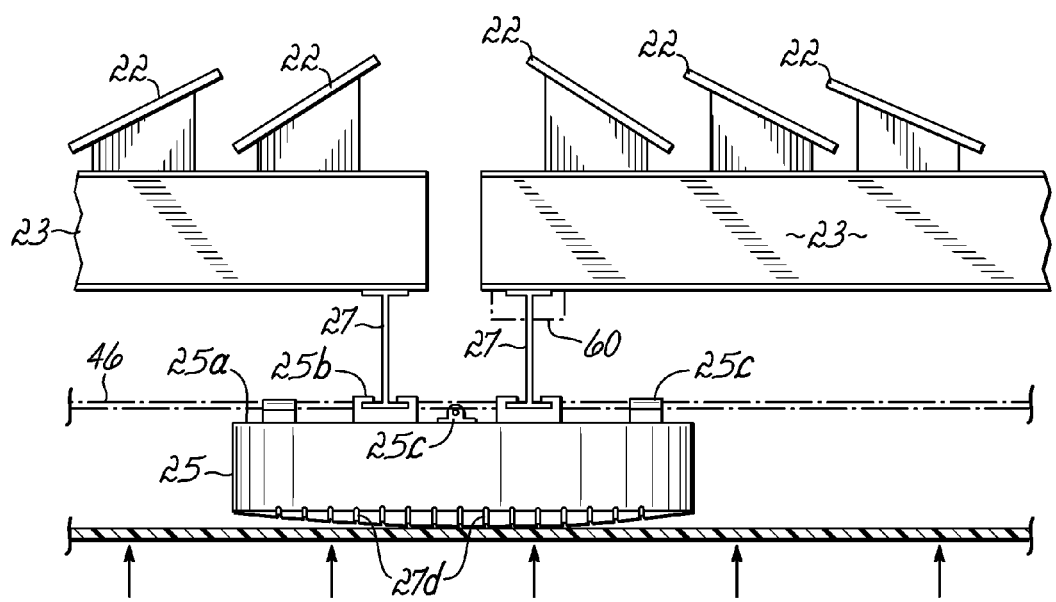
FIG. 7B is a horizontal view which schematically shows the pod and other structures shown in FIG. 7A.

In addition to the space frame 27, or as an alternative thereto, the cable system can be used for supporting the solar collector modules. FIGS. 7A and 7B show the cable 46 in phantom, to illustrate that it is an additional, or an alternative structure for providing support. Also, as shown in FIG. 7B, the pod 25 includes upwardly extending hangers 25c which connect to the cable 46. Still further, FIG. 7B shows a sensor 60, which may be a strain gauge, mounted in position to sense the strain on the space frame 27. As mentioned previously, a plurality of such sensors 60 are distributed throughout the platform 12, and are operatively connected in a network (not shown) to convey to the computer controller 70 (FIG. 3) the sensed conditions. The sensors 60 may be adapted to sense any one of a number of different measurable conditions. Preferably, the controller 70 also causes the compressor system 32 to respond appropriately to the sensed conditions, by dynamically adjusting the amount of over-pressurization.

Figure 8:
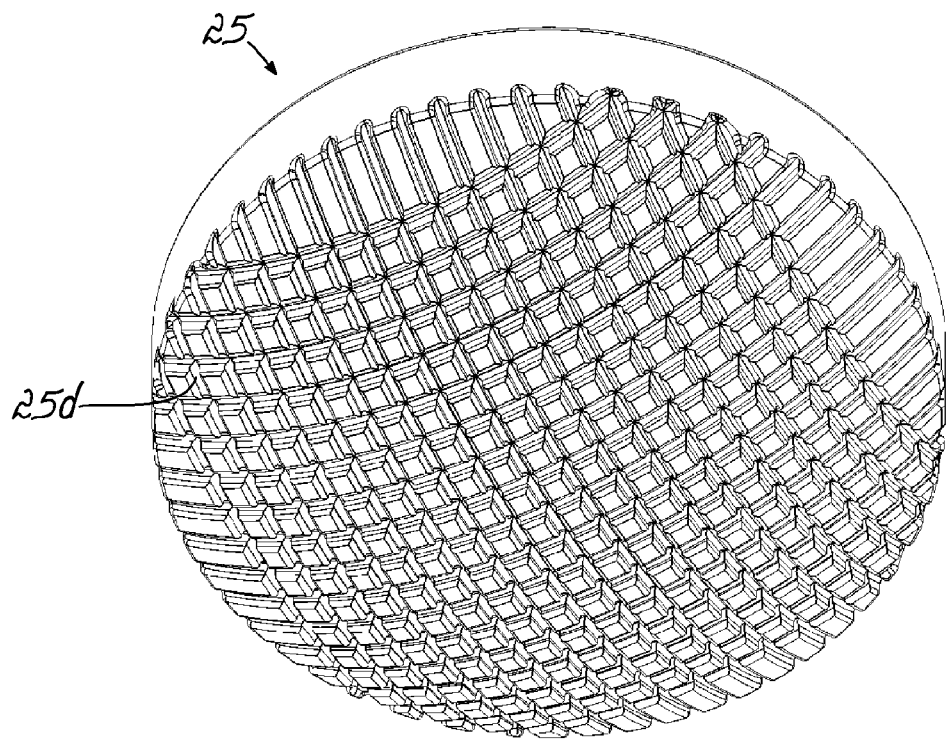
FIG. 8 is a perspective view which schematically shows the bottom of a pod of the type shown in FIGS. 7A and 7B.
Figure 9:
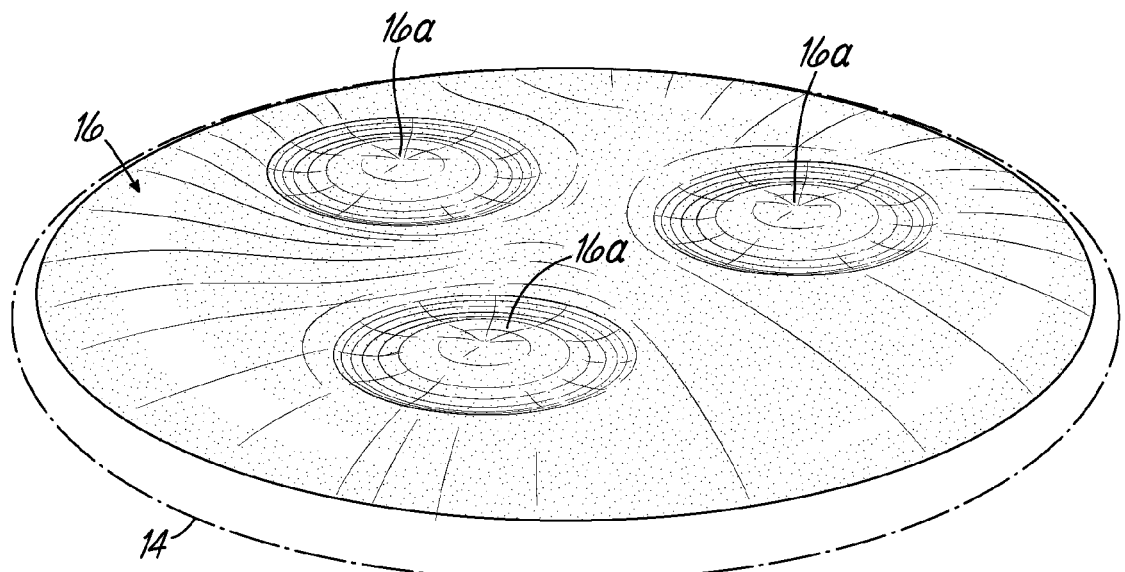
FIG. 9 is a perspective view which schematically shows a computer-model generated simulation of the depressions that could occur on the cover of the man-made island of this invention.

FIG. 8 shows a bottom profiled surface 25d of pod 25. FIG. 9 is a computer simulated view of the cover 16, with three noticeable dimples, or depressions, as a result of the load supported thereabove. These dimples are designated via reference numerals 16a, 16b, and 16c. They show the need for dynamic over-pressurization and strain sensing to achieve a horizontal position of the solar collector modules mounted thereabove. For this embodiment of the invention, or any embodiment involving spaced pods located on the cover, it would be preferable to include drainage valves within the cover, to avoid rainwater accumulation around the pods. Such valves need to remove water from the top of the cover, while preventing any pressure leakage from under the cover.

Figure 10:
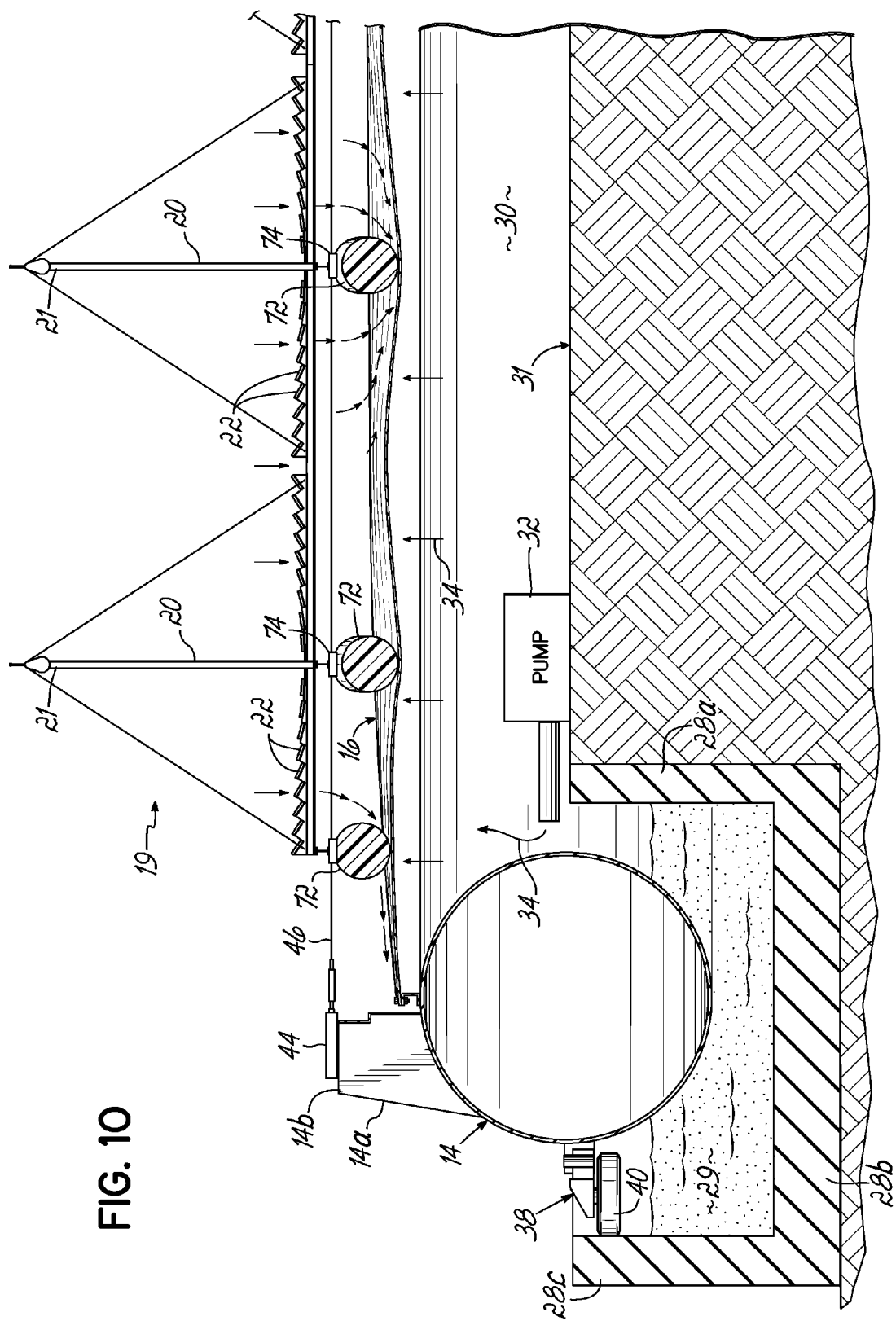
FIG. 10 is a horizontal view that schematically shows a second preferred embodiment for the upper structure of this invention, namely a cable system that cooperates with a plurality of pontoons, which in turn hold support boards onto which Fresnel-type solar concentrators are mounted.

FIG. 10 is similar to FIGS. 4A and 4B, but shows more details of the cable and pontoon structure used to support the rows 19 of solar collector modules. In this particular embodiment of the invention, the cable 46 spans across the top of the cover 16, transversely across a plurality of pontoons 72 which are arranged in parallel rows on the cover 16. The pontoons 72 can be made of plastic or any other suitable lightweight material. Applicants contemplate using pontoons of the type industrially manufactured and distributed by e.g. Robin Kunstoffprodukte, of Teterow, Germany and Technus KG (GmbH and Co.), also of Teterow, Germany. Preferably, the cable 46 engages a plurality of braces, or boards 74, supported on top of the pontoons 72 (or rows of pontoons). The boards 74 support the lattice 23 which holds the solar concentrators 22. FIG. 10 shows depressions formed in cover 16 alongside the pontoons 72. These parallel depressions facilitate the runoff of rainwater, and also eliminate a centrally located bulge that could result from the over-pressurization. Surface runoff may be more controllable because it will generally flow to these known depressions.

Figure 10A:
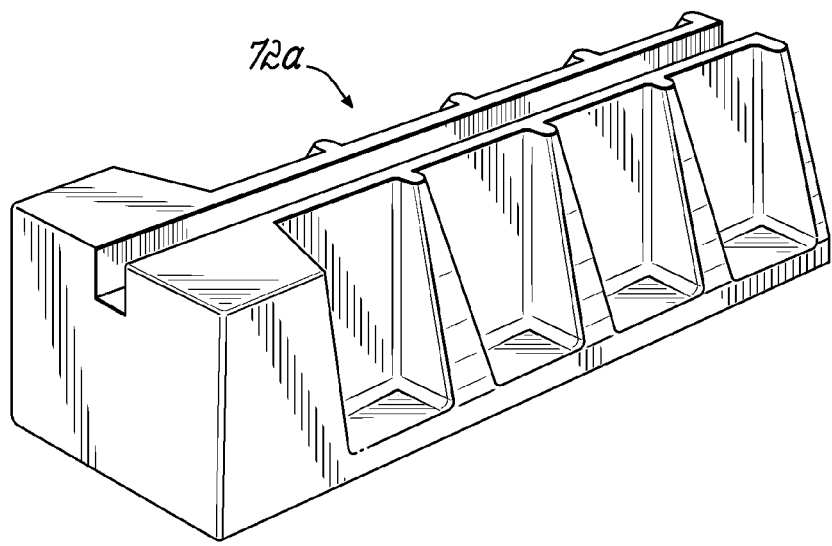
FIG. 10A is a perspective view showing an alternative pontoon structure.

FIG. 10A shows another version of the pontoon, designated by reference numeral 72a. This pontoon 72a has a formed, preferably molded, top surface structure designed to facilitate holding of the upper structure and/or other structure which supports the modules.

Figure 11:
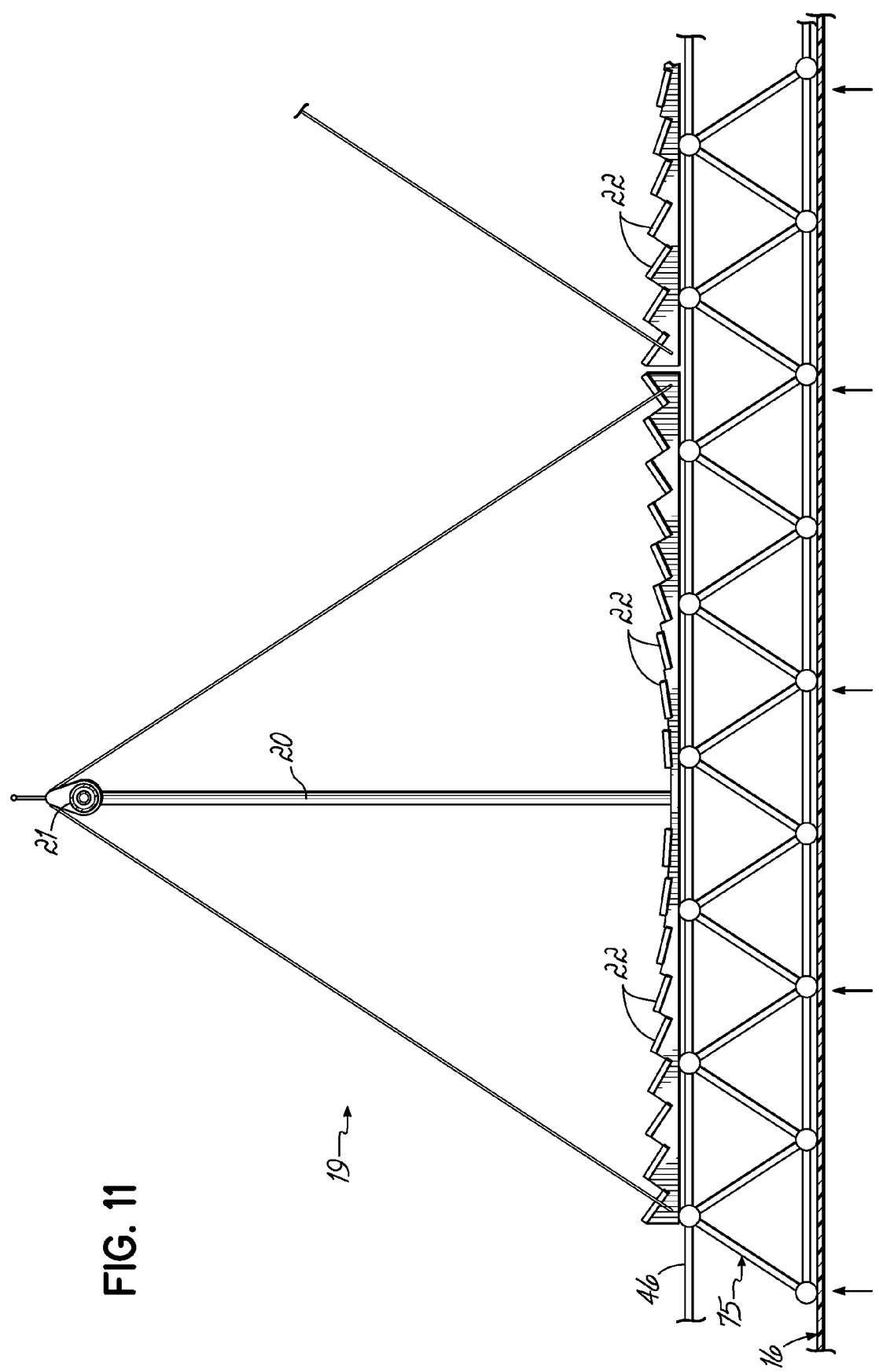
FIG. 11 is a horizontal view which schematically shows a third preferred embodiment for the upper structure of this invention, a honeycomb structure onto which a Fresnel-type collector is mounted.

FIG. 11 shows a side view of yet another embodiment of the upper structure used to support the solar radiation collectors. More particularly, FIG. 11 shows a honeycomb-type structure 75 residing between the cover 16 and the solar collectors 22c and also supported by cable 46.

Figure 12A:
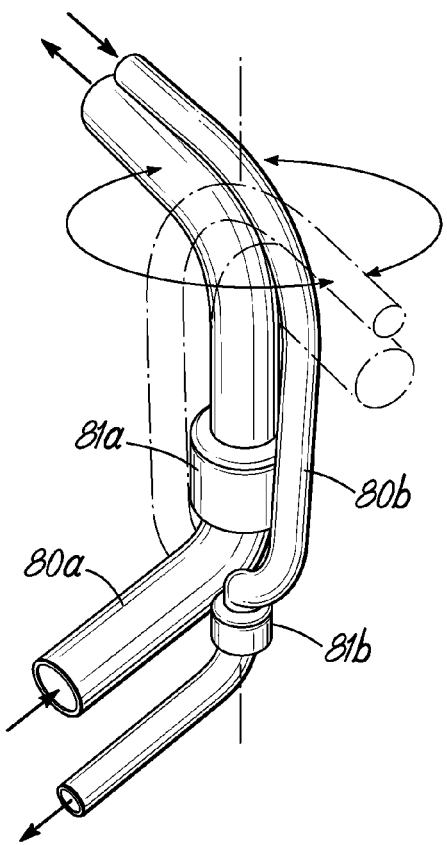
FIGS. 12A and 12B are perspective views which show two alternative structures for routing fluid, i.e. water and/or steam, to and from the island 10 via a rotary joint located at the hub 18.
Figure 12B:
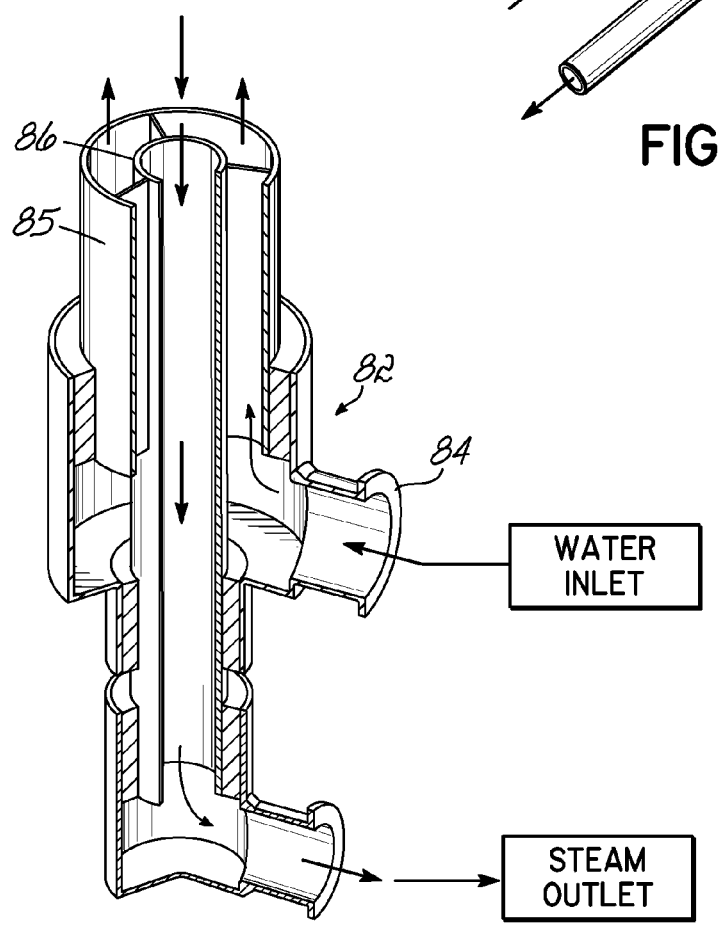

FIGS. 12A and 12B show variations on the rotary joint for use at the center hub 18 of the island 10. More particularly, FIG. 12A shows an inlet pipe and an outlet pipe, designated 80a and 80b respectively, both of which include a respective sleeve 81a and 81b, which permits some relative rotation between the upper and lower sections thereof, at least in the range of about 240 to 260 degrees. FIG. 12B shows a coaxial version 82 of the rotary joint. More particularly, water inlet 84 supplies water to an outer annularly shaped flow passage within outer pipe 85, for water flowing toward the solar collector modules. After the water has been heated and steam has been created, it returns via central heat pipe 86 (which is rotatable with respect to outer pipe 85 and to the inlet 84). The steam generated via the solar collectors eventually flows toward the bottom of the rotary joint 82 and exits the joint via a steam outlet 88. Those skilled in the art will appreciate that one or more pumps (not shown) may be used to cause the water, i.e., the water to be heated, to flow to the island and to the solar collector modules. Similarly, those skilled in the art will also appreciate that one or more pumps (also not shown) may be useful for assisting the outbound flow of steam from the island. To some extent, the need for these additional components will depend on the location and the type of energy generating device that is operatively connected to the output line from the island.

Figure 13B:
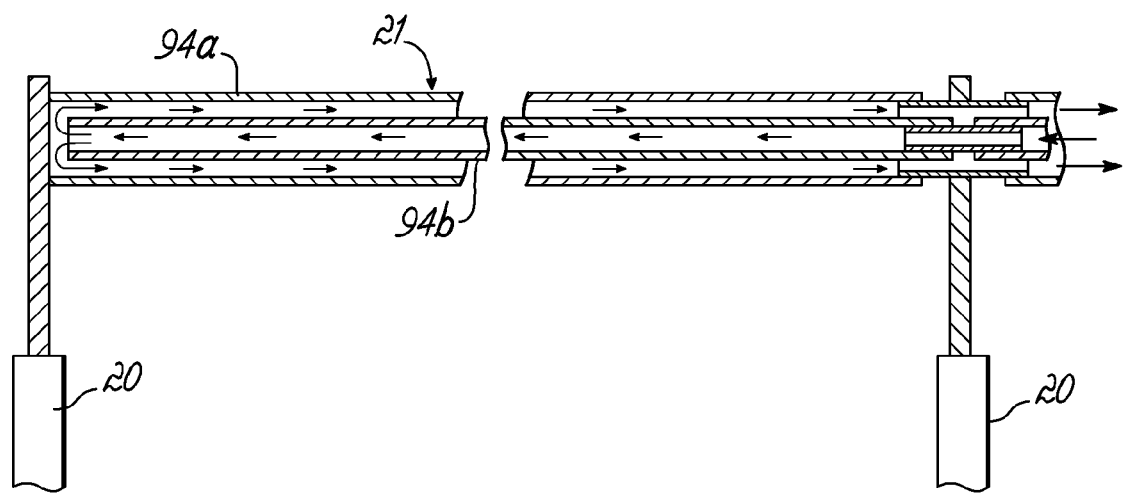
FIG. 13B is a cross-sectional view along lines 13B-13B of FIG. 13A.

FIGS. 13A and 13B show two additional features of the invention. More particularly, FIG. 13A shows a wheel supported cart 90 which rolls along a pair of spaced rails 92 arranged parallel with the rows 19 of the solar collector modules. This facilitates maintenance of the collectors, and does so in a manner that does not interfere with the solar collection structure.

FIG. 13B shows one embodiment for incorporating a preheating feature into this invention. More particularly, FIG. 13B shows the uprights 20 of one of the rows 19 of solar collector modules, and the heat pipe 21 configured as a coaxial pipe structure 94 that spans between the uprights 20. More particularly, the pipe structure 94 is a coaxial pipe with an outer annular channel 94a and a centrally located inner channel 94b. With the panels 22 of the solar collector modules concentrating and directing the sunlight upwardly, water flowing outbound (to the left in FIG. 13B) via central channel 94b is preheated by the heat emanating from steam flowing in the outer channel 94a (which is flowing to the right in FIG. 13B). The outer channel 94a receives the greatest concentration of redirected radiation from the sunlight. Thus, the heated steam within channel 94a also causes heat to emanate radially inwardly to preheat the fluid flowing in the inner channel 94b. This same principle could be used with an upper outbound channel 94a and a lower return (steam generating) channel 94b, if the coaxial version of this piping structure proves too cumbersome or too expensive to manufacture or install.

Figure 3A:
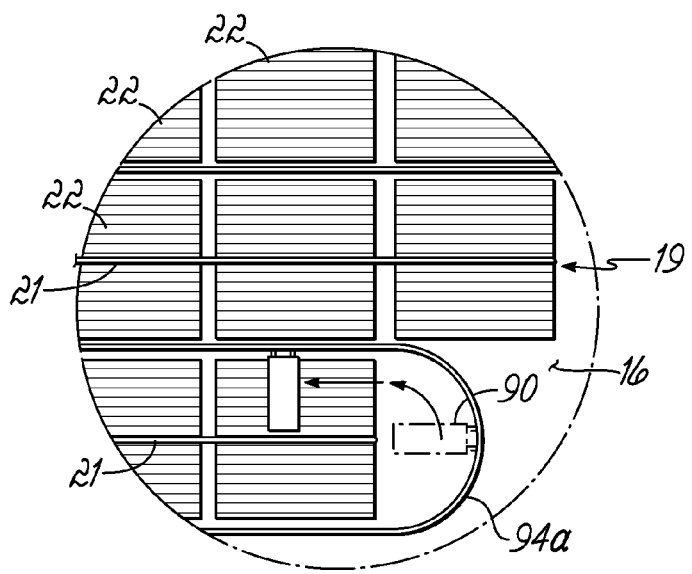
Figure 14:
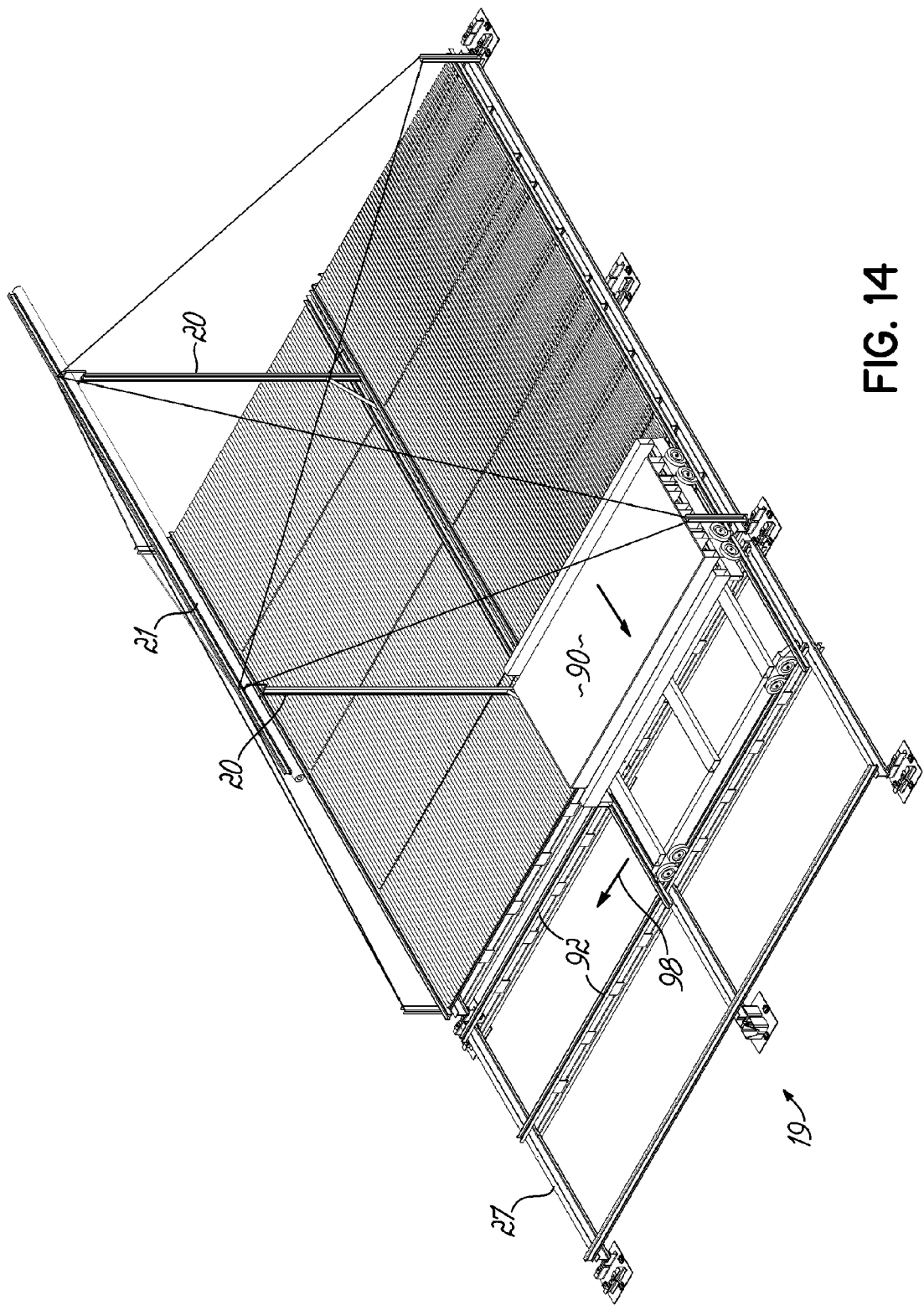
FIG. 14 is a perspective view which shows another aspect of the cart shown in FIG. 13A.

FIG. 14 shows the capability for the cart 90 to move laterally along, or transversely to one of the rows 19 of solar collectors, at the end of the row 19, as shown by directional arrow 97, along a transversely directed track. This enables the cart 90 to service the entire surface area of the cover 16 occupied by the rows 19 solar collector modules. As shown in FIG. 3A, adjacent row 19 access could also be obtained by adding an outer half circular track 94a to connect adjacently located rows. These connector tanks can be removable, for temporary use, to accommodate multiple rows 19. The type of structure can be used for regular servicing of the island 10, for example, for cleaning the panels 22 of the solar collector modules.

One embodiment of the invention contemplates that the outer ring structure, in the case of the water-deployed manmade island 10a (shown in FIG. 1A), would contain a hydrogen production facility in a hermetically sealed pipe section attached under the outer ring structure 14a. Such a hydrogen production facility could be completely submerged, and run in a way that the electrolysis generator could operate in an evacuated or an inert gas environment, thereby to substantially reduce any potential accident risks. It is also envisaged to use two concentric pipe sections in the construction of such a hydrogen production facility—in other words the electrolysis generator would then be housed in a double-walled structure.

Hydrogen production and distribution facilities are generally not considered to be dangerous; they are not systematically prone to risks of uncontrolled combustion. However, as http://www.eihp.org/public/Reports/Final_Report/Sub-Task_Reports/ST5.2/RISK%20ASSESSMENTS %20OF%20H2-REFUELLING%20STATION_Onsite_%20CONCEPTS.pdf shows, these facilities require frequent maintenance and ongoing surveillance in order to effectively control such risks. An evacuated environment or an environment filled with inert gas would substantially reduce those risks, as hydrogen and oxygen gas sensors would immediately warn about the risk of a leak developing. For regular maintenance every few months, such a hydrogen production facility could be shut off and outside air pumped in before the maintenance crews enter the scene.

For the land-based version of the man-made island, a hydrogen generation facility would be constructed at a sufficient distance from the solar island 10 to prevent any potential hazardous exposure.

While this specification describes a number of preferred embodiments and other variations of the invention, those skilled in the art will appreciate that the particular structures shown and described are susceptible to a reasonable degree of modification, and hence, the invention is not limited in scope to the specific details shown and described. Application wishes only to be limited by the broadest reasonable interpretation of the following claims.

I claim:

1. A solar energy collection system comprising:
   a platform floating above a body of fluid, the platform including a hollow outer ring structure and a flexible cover that is peripherally sealed to a top end of the outer ring structure, thereby to define an enclosed volume below the cover;
   a compressor for creating a suitable over-pressure condition within the enclosed volume;
   a plurality of solar radiation collector modules held above the cover the solar radiation collector modules configured to allow ambient airflow between the cover and solar radiation collector module;
   an upper structure located above the cover and holding the solar radiation collector modules; and
   the platform being rotatable about a center axis thereof, thereby to enable the orientation of the solar radiation collector modules to be variable and placed at a desired orientation depending on the angular position of the sun.

2. The solar energy collection system of claim 1 wherein the system is land-based and further comprising:
   a lower ring-shaped trough residing below the outer ring structure and adapted to hold a fluid of suitable viscosity, thereby to floatably support the outer ring structure on the fluid within the trough.

3. The solar energy collection system of claim 2 wherein the fluid is water.

4. The solar energy collection system of claim 1 wherein the suitable overpressure is at least 1/10 bar.

5. The solar energy collection system of claim 1 wherein the outer ring structure is at least several meters tall.

6. The solar energy collection system of claim 1 wherein the cover has at least one of the following characteristics:
   a) UV resistant; and
   b) of foil composition.

7. The solar energy collection system of claim 1 and further comprising:
   a drive mechanism adapted to driveably rotate the platform about its center axis to a desired position, depending on the position of the sun; and
   a computer operatively connected to the drive mechanism and adapted to control the position thereof according to a suitable algorithm.

8. The solar energy collection system of claim 1 and further comprising,
   a plurality of strain gauges mounted on the upper structure and operatively interconnected in a network, the strain gauges adapted to sense the strain on the upper structure; and
   a controller operatively connected to the network and also to the compressor, and adapted to dynamically adjust the over-pressure condition within the enclosed volume so as to minimize the mechanical load on the upper structure.

9. The solar energy collection system of claim 1 and further comprising:
   an energy conversion system operatively connected to the solar radiation collector modules.

10. The solar energy collection system of claim 9 wherein the energy conversion system comprises an electrolysis generator for producing hydrogen.

11. The solar energy collection system of claim 10 wherein the electrolysis generator is located within the outer ring structure.

12. The solar energy collection system of claim 1 and further comprising:
   rainwater drainage channels formed in the cover to facilitate rainwater runoff; and
   a water collection device operatively connected to the rainwater drainage channels.

13. The solar energy collection system of claim 12 and further comprising:
   a sea-water desalinization facility in cooperation with the water collection device.

14. A solar energy collection system comprising:
   a platform floating above a body of fluid, the platform including a hollow outer ring structure and a flexible cover that is peripherally sealed to a top end of the outer ring structure, thereby to define an enclosed volume below the cover;
   means for creating a suitable over-pressure condition within the enclosed volume;
   a plurality of solar radiation collector modules held above the cover the solar radiation collector modules configured to allow ambient airflow between the cover and solar radiation collector module;
   an upper structure located above the cover and holding the solar radiation collector modules; and
   the platform being rotatable about a center axis thereof, thereby to enable the orientation of the solar radiation collector modules to be variable and placed at a desired orientation depending on the angular position of the sun.

15. The solar energy collection system of claim 14 and further comprising,
   a plurality of strain gauges mounted on the upper structure and operatively interconnected in a network, the strain gauges adapted to sense the strain on the upper structure; and
   a controller operatively connected to the network and also to the means for creating the suitable over-pressure condition within the enclosed volume so as to minimize the mechanical load on the upper structure.

16. A method for collecting solar energy, comprising:
   floating a platform above a body of fluid, the platform including a hollow outer ring structure and a flexible cover that is peripherally sealed to a top end of the outer ring structure, to define an enclosed volume below the cover;
   pressurizing the enclosed volume; and
   holding a plurality of solar radiation collector modules above the cover with an upper structure located above the cover the solar radiation collector modules configured to allow ambient airflow between the cover and solar radiation collector module;
   wherein the platform is rotatable about a center axis thereof, thereby to enable the orientation of the solar radiation collector modules to be variable and placed at a desired orientation depending on the angular position of the sun.

17. The solar energy collection system of claim 1, wherein the flexible cover is substantially circular and is circumferentially sealed to the top end of the outer ring structure.

18. The solar energy collection system of claim 1, wherein the flexible cover is attached to the top end of the outer ring structure.

19. The solar energy collection system of claim 18, wherein the flexible cover is permanently attached to the top end of the outer ring structure.

* * * * *